United States Patent [19]

Jackson

[11] 4,065,259

[45] Dec. 27, 1977

[54] FLUOROCARBON DYE DISPERSION FOR EXHAUST DISPERSE DYEING

[75] Inventor: Harold Leonard Jackson, Hockessin, Del.

[73] Assignee: E. I. Du Pont de Nemours and Company, Wilmington, Del.

[21] Appl. No.: 679,905

[22] Filed: Apr. 23, 1976

Related U.S. Application Data

[63] Continuation-in-part of Ser. No. 466,844, May 3, 1974, abandoned, which is a continuation-in-part of Ser. No. 322,126, Jan. 9, 1973, abandoned.

[51] Int. Cl.$^2$ .......................... D06P 5/00; D06P 1/64; C09B 67/00
[52] U.S. Cl. .......................................... 8/166; 8/1 W; 8/39 B; 8/39 C; 8/41 B; 8/41 C; 8/85 A; 8/93; 8/94 R; 8/94 A; 8/142; 8/169; 8/172 R; 8/173; 8/174; 8/176; 8/179
[58] Field of Search ............... 8/169, 172 R, 174, 175, 8/176, 94, 173, 85 A, 93, 94 R, 94 A, 166

[56] References Cited

U.S. PATENT DOCUMENTS

| 3,768,968 | 10/1973 | van der Eltz ........................... 8/175 |
| 3,788,810 | 1/1974 | Kalz et al. .......................... 8/162 R |
| 3,822,992 | 7/1974 | Hederich et al. ........................ 8/39 |
| 3,846,070 | 11/1974 | Langmann et al. ...................... 8/172 |

*Primary Examiner*—A. Lionel Clingman

[57] ABSTRACT

Fluorocarbon dye dispersion comprising an organic disperse dye; a certain normally liquid fluorocarbon having a fluorine to carbon atom ratio of at least 1.5, a solubility parameter of not greater than 7.0 and a critical temperature of at least 135° C., and, optionally, an effective amount of a compound having both surface activity and solubility in the normally liquid fluorocarbon, said dye dispersion being useful in the exhaust dyeing of disperse dyeable synthetic polymers, in the form of films, fibers or fabrics, by the process comprising contacting the polymer with the dye disperson at a temperature above the glass transition temperature of the polymer for a sufficient time to exhaust the dye onto the polymer.

13 Claims, No Drawings

FLUOROCARBON DYE DISPERSION FOR EXHAUST DISPERSE DYEING

CROSS-REFERENCE TO RELATED APPLICATIONS

This is a continuation-in-part of application Ser. No. 466,844 filed May 3, 1974 as a continuation-in-part of application Ser. No. 322,126 filed January 9, 1973. Both earlier applications are now abandoned.

BACKGROUND OF THE INVENTION

1. Field of the Invention

This invention relates to fluorocarbon dye dispersions and to the exhaust dyeing of synthetic polymers therewith.

2. Description of the Prior Art

It has been recognized in the art that there is an advantage in carrying out dyeings on synthetic fibers using disperse type dyes in nonaqueous systems. Such processes have lower energy requirements, due to the lower specific heats and heats of vaporization of organic solvents, than processes employing water. It also has been recognized that exhaust dyeing from organic solvents carries with it certain inherent limitations. It is known that the degree of dyeing in exhaust procedures depends on the partition function of the dye between the dyeing medium and the fiber. In aqueous systems this function favors the fiber because of the low solubility of disperse dyes in water. In organic solvents the favorable partition function of aqueous systems is often lost or at least decreased because the dyes tend to be considerably more soluble in the organic solvents than in water. Gebert in Melliand Textilberichte, 52 (6), 710-715 (1971) discloses that for dyeing from perchloroethylene the dye must have low solubility in the solvent. German Pat. No. 2,002,286 discloses the use of certain specific halogenated methanes or ethanes having poor dye solvent properties, such as 1,1,2-trichloro-1,2,2-trifluoroethane, monofluorotrichloromethane or 1,2-dichloro-1,1,2,2-tetrafluoroethane. Since the dyeings are carried out at relatively low temperatures with these solvents, heat fixation of the dyes in the fibers is usually achieved by the well known dry heat or Thermosol technique. Such a method, therefore, involves a two step process.

DETAILED DESCRIPTION OF THE INVENTION

The present invention resides in a fluorocarbon dye dispersion which can be used in a single step exhaust dyeing procedure whereby disperse dyes are applied to and fixed in disperse dyeable synthetic polymers, in the form of films, fibers or fabrics, said procedure providing a high degree of exhaust and fixation. The dye dispersion comprises:

a. an organic disperse dye;
b. a normally liquid fluorocarbon having a fluorine to carbon atom ratio of at least 1.5, a solubility parameter of not greater than 7.0 and a critical temperature of at least 135° C.; and, optionally,
c. an effective (dispersing) amount of a compound having both surface activity and solubility in the liquid fluorocarbon.

The normally liquid fluorocarbon of above description is selected from the group consisting of 1. branched perfluoroaliphatic hydrocarbons,
2. perfluorocycloaliphatic hydrocarbons,
3. chlorofluoroalkanes,
4. hydrofluoroalkanes,
5. hydrochlorofluoroalkanes,
6. perfluoroalkyl ethers,
7. hexafluoropropylene oxide polymers having a degree of polymerization of 1-50,
8. perfluoro(tri-$C_{1-12}$alkylamines) and
9. unsaturated fluorocarbons having 3-4 perfluoroalkyl groups of 1-10 carbon atoms attached to the

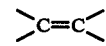

moiety, each of said groups (1)–(6) having no more than 18 carbon atoms. The dyeing procedure comprises contacting the disperse dyeable synthetic polymer with the dispersion at a temperature above the glass transition temperature of the polymer for a sufficient time to effect dyeing of the polymer by exhaustion of the dye into the polymer from the dispersion.

Preferred embodiments of the invention include the aforesaid dye dispersions, and the use thereof in the aforesaid process, wherein the compound having both surface activity and solubility in the liquid fluorocarbon is $F[CF(CF_3)CF_2O]_9CF(CF_3)CO_2H$; wherein the liquid fluorocarbon is perfluoro(tributylamine), perfluoro(dimethylcyclobutane) or $F[CF(CF_3)CF_2O]_3CHFCF_3$; and wherein there is present up to 5 volume % of water. Finally, preferred embodiments of the aforesaid process include those wherein the disperse dyeable synthetic polymer is polyethylene terephthalate and the dyeing temperature is at least 125° C.

The process is useful with any synthetic polymer normally dyeable with disperse dyes, for example, polyesters, polyamides, cellulose acetate, cellulose triacetate, and the like; it is also useful with certain acrylic polymers. It is particularly useful with polyesters, such as polyethylene terephthalate. It can also be used to dye such synthetic polymers which are blended with another component or components, such as cotton, wool, and the like, for example, blend fabrics of such materials, without effecting dyeing of the other component or components. The process can be used to dye synthetic polymers in any dyeable form but it is generally employed with such polymers in the form of fabrics, fibers or films. The process is carried out by contacting the synthetic polymer with the dispersion of the disperse dye (one or more dyes can be used) in a normally liquid fluorocarbon which is selected from the aforesaid nine groups of compounds and has a fluorine to carbon atom ratio of at least 1.5, a solubility parameter not greater than 7.0 and a critical temperature of at least 135° C., at a temperature greater than the glass transition temperature (Tg) of the polymer. When the exhaust dyeing is completed excess dye and dye bath liquor are removed from the dyed polymer by rinsing and/or scouring with the same liquid fluorocarbon used in the dispersion, with a different liquid fluorocarbon or with some other liquid, and the dyed polymer is then dried.

Disperse dyes are a well known group of organic dyes having the common property of being free of solubilizing ionic groups. Solubilizing, as the term is used here, refers to solubilizing in water, not in organic solvents. Disperse dyes are derived from all of the major known chromophoric color systems. The majority of commercially available disperse dyestuffs are derived from azo, anthraquinone, quinophthalone, oxazine, stilbene, benzothioxanthene or benzoxanthene systems; other types of disperse dyes are also well known, for example, metallized disperse dyes. Disperse dyes are distinguished from organic pigments in that the former are usually soluble in common organic solvents, such as N,N-dimethylformamide, whereas the latter are not. The present invention is not limited to any particular type of disperse dye. Any known disperse dye or mixture of disperse dyes which can be used to dye the aforementioned synthetic polymers by aqueous procedures can be used in the present procedure. Water insoluble brightening agents are considered to be disperse dyes herein and are useful in the dispersion and in the process of this invention.

The normally liquid fluorocarbon which is used in the dispersion and in the process of the present invention and which is selected from the aforesaid nine groups of compounds must meet certain requirements. First of all, it must be normally liquid, that is, it must have an atmospheric pressure boiling point of at least about room temperature (20°–25° C.), so as to preclude loss thereof during preparation, storage and handling of the dye dispersion of this invention prior to the usage of the dispersion in the dyeing process of this invention. Next, it must have a fluorine to carbon atom ratio of at least 1.5, that is, there must be at least 1.5 fluorine atoms per carbon atom in the molecule. Preferably, the fluorine to carbon atom ratio is at least 2.0. The remaining constituents of the molecule are usually hydrogen atoms, other halogens, particularly chlorine atoms, or heteroatoms, in particular, either oxygen or tertiary amine nitrogen atoms. The normally liquid fluorocarbon must have a solubility parameter (as hereinafter defined) of not greater than 7.0. This is to ensure that the dye is sufficiently insoluble in the normally liquid fluorocarbon to have a partition function which favors the polymer rather than the liquid. When the solubility parameter is no greater than 7.0, dye utilization exceeds 25%; usually it exceeds 50% and quite often dye utilizations in excess of 75% are obtained. Such results may be compared to the use of tetrachloroethylene, with a parameter of 9.7, which gives utilizations of less than 25% under the same conditions described herein for the instant process. Preferably, the solubility parameter of the normally liquid fluorocarbon employed herein is no greater than 6.5. The normally liquid fluorocarbon must also have a critical temperature of at least about 135° C. since the dyeing procedure of the invention requires temperatures which may reach 135° C.

There are a number of known, useful, normally liquid fluorocarbons having the aforementioned properties. These include the following, with the solubility parameters being given in parentheses if they have been measured or calculated: branched perfluoroaliphatic hydrocarbons of not more than 18 carbon atoms, such as perfluoro(2,3-dimethylbutane) (5.9), perfluorokerosene and its constituents boiling above 100° C. and $(CF_3)_2CF(CF_2-CH_2)_{2-4}CF(CF_3)_2$; perfluorocycloaliphatic hydrocarbons of not more than 18 carbon atoms, such as perfluoro(dimethylcyclobutane) (5.6); perfluoroalkyl ethers of not more than 18 carbon atoms, such as perfluoro(N-propylmorpholine) (6.0), perfluoro(2-butyltetrahydrofuran) and perfluoro(2-propyltetrahydropyran); the hexafluoropropylene oxide polymers having a degree of polymerization of 1–50, such as $F[CF(CF_3)CF_2O]_nCHFCF_3$ (5.5–6.5), $n$ being and integer within the range 1–50, preferably 3–6, and $F[CF(CF_3)CF_2O]_mCF_2CF_3$, $m$ being an integer within the range 1–50, preferably 3–6; perfluoro(tri-$C_{1-12}$alkylamines), such as perfluoro(tributylamine); chlorofluoroalkanes of not more than 18 carbon atoms, such as 1,2-dichloroperfluorocyclobutane (6.5), 2,3-dichloroperfluorobutane (6.5), 2,2- or 2,3-dichloroperfluoropropane (6.3), 2,2,3-trichloroperfluorobutane (7.0), 1-chloroperfluorodecane and 1-chloroperfluorododecane; hydrofluoroalkanes of not more than 18 carbon atoms, such as 1-hydroperfluorooctane (about 6.0); hydrochlorofluoroalkanes of not more than 18 carbon atoms, such as 1-chloro-9-hydroperfluorononane (6.2); and unsaturated fluorocarbons which have three or four $C_{1-10}$ perfluoroalkyl groups, preferably $C_{1-3}$ perfluoroalkyl groups, attached to the

moiety. The above listing is not intended to be complete. Any of the above fluorocarbons or a mixture thereof is meant to be included. Fluorocarbons which are not useful herein because they are not normally liquids and/or have insufficiently high critical temperatures and/or have solubility parameters which are too high are tetrafluoromethane, chlorotrifluoromethane, dichlorodifluoromethane, trichlorofluoromethane (solubility parameter greater than 7.0), chlorodifluoromethane, hexafluoroethane, chloropentafluoroethane, 1,1,2-trichloro-1,2,2-trifluoroethane (solubility parameter 7.2) and octafluorocyclobutane. In general, unsaturated fluorocarbons, except those noted above, are excluded or undesirable because of their reactivities, especially with free amino groups, such as often are present in disperse dyes, and because they often are highly toxic. Aromatic fluorocarbons, such as hexafluorobenzene or chlorotetrafluorobenzene, are not useful herein because their solubility parameters are too high.

The solubility parameter of a liquid fluorocarbon can be calculated from the equation $$\delta = \left[ \frac{\Delta H - RT}{V} \right]^{\frac{1}{2}}$$

where $\delta$ is the solubility parameter, in the units of (calories/cc.)$^{1/2}$, $\Delta H$ is the heat of vaporization per mole, R is the gas constant, T is the absolute temperature and V is the volume per mole, all in consistent units. $\Delta H$, if not already known, is readily determined by standard methods. V, if not known, is easily calculated from the density of the compound by dividing it into the molecular weight. Critical temperature, if not known, can be closely estimated by using the empirical formula $T_c = 1.41T_B + 66 - 11F$. $T_c$ is the critical temperature in ° K., $T_B$ is the boiling point in ° K. at one atmosphere of pressure and F is the number of fluorine atoms present in the molecule. $T_B$ can never be greater than $T_c$. The solubility parameter is a constant which characterizes each material; it is often known as the Hildebrand solubility parameter. The theory underlying the solubility parameter is that solvents tend to dissolve substances with similar solubility parameters but not substances with widely different solubility parameters. Since disperse dyes have high parameters, the liquid fluorocarbon should have a low parameter. The synthetic polymers which are useful herein also usually have high parameters; hence, the liquid fluorocarbons of low parameters are less likely to attack the polymer. The use of solubility parameters is well known, as exemplified by Burrell, Official Digest, Federation of Paint and Varnish Production Clubs ODFPA, 27, 726 (1958) and Burrell et al., Polymer Handbook, Brandrup et al., editors, John Wiley and Sons, New York, N.Y., 1966 (IV), page 341.

The dispersion of organic disperse dye in normally liquid fluorocarbon optionally contains a compound having both surface activity and solubility in the liquid fluorocarbon. Such a compound is referred to herein as a surface active agent, surfactant, emulsifying agent, dispersing agent or dispersant. Usually, a surface active agent is employed to ensure the attainment of level uniform dyeings which are free of specks or spotty accumulations of dye. The use of a surface active agent may not be necessary if, for example, the disperse dye is extremely finely divided or the disperse dye has at least some limited solubility in the liquid fluorocarbon, especially at elevated temperatures. Since the dye can thus be levelly applied to the polymer substrate by either of such expedients, the need for a surface active agent is minimized or eliminated entirely. The more useful surface active agents have hydrophile-lipophile balance (HLB) values of less than 4 (See, for example, Schick, "Nonionic Surfactants", Vol. 1, Chapter 18, Dekker, 1967; Becker, "Emulsion Theory & Practice", 2nd Ed., 1965, page 233 et seq.; and Kirk-Othmer, "Encyclopedia of Chemical Technology", 2nd Ed., Vol. 8, page 128 et seq.). Surface active agents, as is well known, occur as two general types, ionic and nonionic. The ionic group is further subdivided into cationic and anionic. Surface active agents containing fluorinated groups are generally preferred in preparing the dye/liquid fluorocarbon emulsions herein, but useful surfactants are not limited to those containing fluorinated groups. Useful well known ionic surfactants include, where $R_f$ is a perfluoroalkyl group, generally of 3–18 carbon atoms, perfluoroalkanecarboxylic acids $R_fCO_2H$ and their salts; perfluoroalkanesulfonic acids $R_fSO_3H$ and their salts; acids containing perfluoroalkyl terminated aliphatic groups, such as $R_fCON(R)$-$R'$-$CO_2H$, $R_fSO_2N(R)$-$R'$-$CO_2H$, $R_f(CH_2)_nO$-$R'$-$SO_3H$, $R_f$-$R'$-$CO_2H$, $R_f$-$R'$-$SO_3H$, $R_f$-$R'$-$S$-$R'$-$CO_2H$, $R_f$-$R'$-$O$-$R'$-$CO_2H$, $R_f$-$R'$-$PO(OH)_2$ and $R_f$-$R'$-$SO_4H$, where R is H or alkyl, $R'$ is alkylene and $n$ is at least one, generally 1–14. Also included, where $R_f$, R and $R'$ are as above and $R_f'$ is F or $CF_3$, Q is quaternary ammonium, $X-$ is an anion, $n$ is at least one, generally 1–10, $m$ is generally 2–12 and $a$ is 1 or 2, are the carboxylic acids of structure $F[CF(R_f') CF_2O]_n$-$CF(R_f') CO_2H$, prepared by polymerization of tetrafluoroethylene oxide or hexafluoropropylene oxide; phosphate esters, such as $[R_f$-$R'$-$O]_aP(O) (OH)_{3-a}$; perfluoroalkyl containing quaternary ammonium salts, such as $[R_fCONH(CH_2)_mNR_3]+X-$, $[R_fSO_2NH(CH_2)_mNR_3]+X-$, $[R_f$-$R'$-$SO_2NH(CH_2)_mNR_3]+X-$, $[R_fSO_2N(R)$-$R'$-$CH_2OCH_2Q]+X-$, $[R_f$-$R'$-$CONHCH_2Q]+X-$, $[R_fCONHCH_2Q]+X-$, $[R_f$-$R'$-$O$-$CH_2Q]+X-$, $[R_fSO_2N(R)$-$R'$-$CONHCH_2Q]+X-$, $[R_fO[CF(CF_3)CF_2O]_nCF(CF_3)CONH$-$R'$-$NR_3]+X-$, $[R_f$-$CO$-$NH$-$R'$-$N+(R)_2$-$R'$-$CO_2-]$, $[R_fCH_2O_3S$-$CH_2NR_3]+X-$, $[R_f$-$R'$-$NR_3]+X-$ and $[R_f$-$R'$-$SO_2NH$-$R'N+(R_2)$-$R'CO_2-]$. This list is not intended to be complete since there are other known ionic fluorinated surfactants which are useful herein.

Some typical but not all inclusive examples of useful nonfluorinated surfactants are the mono and bis phosphate esters of fatty alcohols $(R$-$O)_aP(O) (OH)_{3-a}$, where $a$ is 1 or 2 and R is $C_{8-14}$ alkyl, and the alkylamine salts $(RO)_aP(O) (OH)_{3-a}$·$NH_2$-$R''$ where $R''$ generally is $C_{6-18}$ alkyl, for example, 2-ethylhexyl; lower alkylamine salts or higher alkylbenzenesulfonic acids, a typical example being isopropylammonium dodecyclbenzenesulfonate; quaternary ammonium salts made by reacting N,N,N',N'-tetrakis (2-hydroxypropyl)ethylenediamine fatty acid esters with methyl sulfate; typical nonionics such as $RNH(CH_2CH_2O)_{25}H$ where R is $C_{12-22}$ alkyl; the adducts of ethylenediamine and propylene oxide, then ethylene oxide; and silicone surfactants $R'([-Si(R)_2O]_y)_a([C_nH_{2n}O]_xR'')_b$ where $y$ is 2 or 3, $n$ is 2, 3 or 4, $x$ is at least 5, $a$ is 1 or 2, $b$ is 1–6 and R, $R'$ and $R''$ are hydrocarbon radicals, a typical example being $C_2H_5Si(O[-Si(CH_3)_2O]_z[C_2H_4O]_x[C_3H_6O]_yC_4H_9)_3$ which contains 50% $C_2H_4O$ units and 50% $C_3H_6O$ units, $z$ being 1 or 2 and $x + y$ being at least 5. Not all silicone surfactants are useful.

The amount of surfactant required will vary with the normally liquid fluorocarbon, the disperse dye and the surfactant itself. For this reason, a certain amount of testing will be required with each specific combination to determine the optimum amounts needed. Typically, however, surfactant concentrations range from 0.1 to about 5 parts per part of dye.

The dyeing process must be carried out at a temperature above the glass transition temperature of the synthetic polymer. The glass transition temperature of a synthetic polymer depends not only on the chemical composition and/or type of the polymer but also on the physical state of the polymer. For example, polyethylene terephthalate has a Tg of 67° C. in the amorphous condition, 81° C. in the crystalline condition and 125° C. when crystalline and oriented. Nylon behaves similarly. It is, therefore, preferable to carry out the dyeing process at a temperature higher than the highest Tg expectable for the synthetic polymer in question (thus, above 125° C. for polyethylene terephthalate). The synthetic polymer is heated in the dyebath until dye ceases to exhaust from the bath. The optimum time required will vary with the synthetic polymer, the dyebath temperature and the dye itself. As is commonly known in the dyeing art, disperse dyes fall into two classes often known as low energy and high energy dyes, the terms being descriptive of the energy requirements for dye fixation. It should, therefore, be expected that low energy dyes will fix more rapidly and at lower temperatures than high energy dyes and some experimentation will be required to determine optimum dyeing conditions with any particular combination of synthetic polymer and dye. In general, however, dyeings are complete in one hour, and very often, in considerably less than one hour.

When the desired dyeing temperature is less than the atmospheric pressure boiling point of the liquid fluorocarbon, dyeing can be carried out at atmospheric pressure in an unsealed vessel. Because the liquid fluorocarbons tend to be volatile below their boiling points, provision preferably should be made to prevent escape of the vapors of the liquid fluorocarbon. This is desirable not only to prevent contamination of the atmosphere surrounding the dyeing equipment but also to prevent loss of the somewhat expensive liquid fluorocarbon. Commercially avialable equipment for solvent treating textiles and the like is suitable for carrying out the process at atmospheric pressure. When the desired dyeing temperature is above the atmospheric pressure boiling point of the liquid fluorocarbon, the dyeing process must be carried out in a pressure vessel. Equipment is also commercially available for carrying out dyeings under elevated pressures. Care should be exercised to make sure the pressure rating of the equipment used is sufficient to withstand the vapor pressure of the liquid fluorocarbon at the dyeing temperature used. The vapor pressure-temperature relationships of most of the lower boiling liquid fluorocarbons useful in the present dispersion and process are available in the literature.

The use of carriers in aqueous dyeing system for synthetic polymers is well known, particularly in the dyeing of polyesters. Known carriers are useful in the present process. A carrier, if used, should be poorly soluble in the liquid fluorocarbon. A small amount of water in the dye dispersion has a beneficial (carrier-like) effect on the dyeing rate of polyesters, especially at low temperatures. For example, 50 parts of water per one thousand parts of liquid fluorocarbon (5 volume %) increases dye utilization about tenfold at 110° C. Lower alkanols, such as methanol, also provide a beneficial effect.

As already noted, when the dyeing is completed, the dyed synthetic polymer is rinsed or scoured with the same liquid fluorocarbon used in the dispersion, with a different liquid fluorocarbon or with some other liquid, to remove excess adhering dyebath liquid and unfixed dye. When the liquid fluorocarbon used in the dyebath has a relatively elevated boiling point at atmospheric pressure, it is generally preferable to carry out the rinsing or scouring with a relatively low boiling liquid fluorocarbon, such as 1,1,2-trichloro-1,2,2-trifluoroethane, or some other low boiling liquid. Removal of a lower boiling liquid from the synthetic polymer in the subsequent drying step is easier, quicker and requires less thermal energy than removal of a higher boiling liquid. If an undesirable amount of high boiling liquid fluorocarbon accumulates in the low boiling rinse liquid, the two may be separated by distillation. After rinsing, the dyed synthetic polymer is dried by means well known in the art. Preferable methods include heating or passing warm air through the polymer mass to cause evaporation of retained liquid. In any case, it is usually desirable to recover any evaporated liquid fluorocarbon. This can be accomplished by passing the fluorocarbon vapors over a cold surface or by compressing them, to cause condensation thereof, or by passing them through an adsorbent, such as carbon, to collect the vapors. In the latter case, the adsorbent is subsequently heated and the evolved fluorocarbon is recovered by conventional means.

The dye dispersion and the exhaust dyeing process of this invention provide a highly efficient and, if desired, a completely nonaqueous system for dyeing synthetic polymer fabrics, fibers and films. The process generally avoids the problems and energy requirements of aqueous systems as well as the effects that known solvent dyeing systems have on disperse dyes and synthetic polymers. The liquid fluorocarbons employed herein not only are non-solvents for the dyes but they do not enter the fibers to a measurable degree; in general, the liquids employed in prior art systems do both. Moreover, in the system of this invention, both exhaust and dye utilization are better than in prior art systems.

The following examples illustrate the present invention and the prior art. All parts are by weight unless specified otherwise. One part by volume is the volume of 1 part by weight of water at its maximum density. In the tables parts by weight are designated as P/W and parts by volume are designated as P/V.

I. Dyeing Procedures a. At Atmospheric Pressure (Examples 1-24)

Dyeings were carried out by placing a weighed sample of dye, a weighed amount of dispersing agent and a measured volume of liquid fluorocarbon in an open vessel. In all of Examples 1-24 except Examples 20 and 21 the dispersant was $F[CF(CF_3)CF_2O]_9CF(CF_3)CO_2H$. In Examples 20 and 21 it was the 2-ethylhexylamine salt of $(RO)_aP(O)(OH)_{3-a}$ where R is isooctyl and $a$ is 1 or 2 (average 1.5). The mixture was then stirred and a weighed sample of disperse dyeable synthetic polymer fabric was added. While stirring, the mixture was heated for the desired period. The dyed fabric was then rinsed with trichlorotrifluoroethane, scoured with N,N-dimethylacetamide at room temperature, rinsed again with trichlorotrifluoroethane and then air dried. Examples 1-15, using polyethylene terephthalate double-knit fabric, were carried out using the above procedure and illustrate the present invention; the conditions and results are summarized in Table I. Examples 16-24, which were likewise carried out with the same polyester double-knit fabric, illustrate conditions outside the invention; the conditions and results are shown in Table II. The dyes which were used are shown below. Dyes A and F are typical low and high energy dyes, respectively.

DYE IDENTIFICATIONS

| Dye Symbol | Structure | |
|---|---|---|
| A | $O_2N-\phi-N=N-\phi-N(CH_3)-C_2H_4CN$ | Orange |
| B | $O_2N-\phi(NHCOC_6H_5)-N=N-\phi-N(C_2H_4O_2CCH_3)_2$ | Red |
| C | anthraquinone imide structure, R is a mixture of $-C_2H_4OH$, $-(CH_2)_3OCH_3$ and $-(CH_2)_3OCH(CH_3)_2$ | Blue |
| D | $NH_2, OH, Br$ substituted anthraquinones (two isomers) | Blue |
| E | $C_6H_5NH-\phi(NO_2)-SO_2NH-C_6H_5$ | Yellow |
| F | anthraquinone with $OH$ and $NH-\phi-NHCOCH_3$ | Blue |

DYE IDENTIFICATIONS-continued

| Dye Symbol | Structure | |
|---|---|---|
| G | Anthraquinone with =O, NH, -OC$_6$H$_5$, =O, OH substituents | Red |
| H | Anthraquinone with =O, NH$_2$, -OC$_6$H$_5$, -OC$_6$H$_5$, =O, NH$_2$ | Violet |
| I | Anthraquinone with =O, NH$_2$, -OCH$_2$CH$_2$OCH$_3$, =O, OH | Red |
| J | O$_2$N—C$_6$H$_4$—N=N—C$_6$H$_3$(CH$_3$)—N(C$_2$H$_4$OH)$_2$ | Red |
| K | Anthraquinone with =O, NH$_2$, -Cl, -Cl, =O, NH$_2$ | Violet |
| L | Anthraquinone with OH, =O, OH / X, =O, NHC$_6$H$_5$ where X is a mixture of —NO$_2$ and —NHC$_6$H$_5$ | Blue |
| M | Anthraquinone with =O, Y / =O, NH—C$_6$H$_4$—CH$_3$ where Y is a mixture of —NH—C$_6$H$_4$—CH$_3$ and —OH | Blue |
| N | O$_2$N—C$_6$H$_4$—N=N—C$_6$H$_3$(Cl)—N(C$_2$H$_4$CN)$_2$ | Orange | b. At Autogeneous Pressure (Examples 25-66)

Weighed samples of dye and dispersing agent were placed in a container. A measured volume of liquid fluorocarbon was added and the mixture was subjected to ultrasonic agitation for 1 minute. A further measured volume of fluorocarbon was then added and the resulting dye dispersion was placed in a pressure vessel with a weighed piece of polyester fabric. The pressure vessel was sealed and heated. After heating for the desired time, the vessel was cooled and opened. The dyed fabric was rinsed in trichlorotrifluoroethane, scoured at room temperature in N,N-dimethylacetamide, rinsed in trichlorotrifluoroethane and then air dried. In some cases a dye paste was first made and it was diluted with liquid fluorocarbon before addition of the fabric. The procedure was otherwise the same. The conditions and results for Examples 25-59 are shown in Table III. In all of Examples 25-59 except Examples 51, 56 and 57 the dispersant was F[CF(CF$_3$)CF$_2$O]$_9$CF(CF$_3$)CO$_2$H. In Examples 51 and 57 it was the same as in Examples 20 and 21. In Example 56 it was (RO)$_a$P(O) (OH)$_{3-a}$ where R is C$_{8-14}$ alkyl and $a$ is 1 or 2 (average 1.5).

Using the same conditions as above, dyeings were carried out using carriers. Examples 60, 61, 65 and 66 in Table IV show the use of two such carriers. Examples 62-64 in Table IV illustrate the use of water as a carrier. The dispersant for Examples 60, 61, 65 and 66 was F[CF(CF$_3$)CF$_2$O]$_9$CF(CF$_3$)CO$_2$H. In Example 62 the dispersant was the isopropylamine salt of dodecylbenzenesulfonic acid; in Example 64 it was the same as in Example 56; in Example 63 it was a mixture of 10 parts of the dispersant of Example 62 and 5 parts of the dispersant of Example 56.

EXAMPLE 67

A mixture of 1 part of dye G and 3 parts of F[CF(CF$_3$)CF$_2$O]$_9$CF(CF$_3$)CO$_2$H was pasted and then stirred with 500 parts by volume of F[CF(CF$_3$)CF$_2$O]$_3$CHFCF$_3$. Nylon 66 woven fabric (50 parts) was placed in the dispersion and the mixture was heated to the boil with agitation. After 5 minutes at the boil (152° C.), the nylon was removed, rinsed, scoured and rinsed as before. The remaining dyebath was essentially colorless and the nylon was strongly dyed a red color.

Essentially the same results were obtained using dyes D and A in the above procedure. When the above fluorocarbon liquid was replaced with an equal volume of a 2:1 mixture of perfluoro(2-butyltetrahydrofuran) and perfluorooctane, b.p. 99°-107° C., excellent dye exhaust to nylon was obtained but fixing was poor. When 50 parts by volume of methanol were added to the dyebath, both exhaust and fixation of dye were excellent. Use of the above solvent mixture at higher temperatures under pressure without methanol gives excellent results.

EXAMPLE 68

Using the procedure of Example 67 with F[CF(CF$_3$)CF$_2$O]$_9$CHFCF$_3$, acetate woven fiber was strongly dyed with good exhaust using dyes A and G. With dye D, dyeing was strong but exhaust was only fair.

EXAMPLE 69

A mixture of 0.7 part of dye I, 1.0 part of surfactant F[CF(CF$_3$)CF$_2$O]$_9$CF(CF$_3$)CO$_2$CH$_2$CH$_2$(OCH$_2$CH$_2$)$_6$OCH$_3$, 300 parts by volume of water and 15,000 parts by volume of perfluoro(dimethylcyclobutane) was agitated to form a dispersion. The dispersion was placed in a pressure vessel along with 713 parts of multifilament test fabric. The fabric contained 13 different weft yarns arranged in 5/16 inch wide strips. The sealed vessel was heated to 130° C. with vigorous agitation and then maintained at 130° C. for 30 minutes. The vessel was then cooled to room temperature and discharged. The final dyebath was clear and colorless, indicating complete dye exhaust. A rinse of the vessel with acetone was also colorless. After a thorough scour of the dyed fabric with aqueous "Duponol" RA surfactant at 95° C., the effectiveness of dyeing of the 13 fibers in the fabric was found to be as follows:

| Fiber | Dye Strength | Cross Sectional Dyeing |
|---|---|---|
| Acetate (dull) | Moderate | Complete penetration |
| "Acrilan" 1656 | Stained | Very weak |

-continued

| Fiber | Dye Strength | Cross Sectional Dyeing |
|---|---|---|
| "Arnel" (dull) | Moderate | Complete penetration |
| Cotton (raw) | None | None |
| "Creslan" 61 | Moderate | Complete penetration, weak |
| "Dacron" 54 | Strong | Complete penetration |
| "Dacron" 64 | Very Strong | Complete penetration |
| Nylon 66 | Moderate | Complete penetration, weak |
| "Orlon" 75 | Tinted | Very weak |
| Silk | Stained | Very weak |
| "Verel" A | Moderate | Complete penetration |
| Viscose | None | None |
| Wool | Stained | None |

Fibers which are dyeable using other systems and disperse dyes are also dyeable with disperse dyes in the present process. Thus, acetate, triacetate ("Arnel"), polyester ("Dacron") and nylon dyed well. On the other hand, cotton, acrylics ("Acrilan", "Orlon"), silk, viscose and wool are known not to dye well with disperse dyes and, for the most part, they did not do so in the present process. Surprisingly, the acrylics "Creslan" 61 and "Verel" A were dyed by the present process.

In another dyeing, 0.7 part of dye J, 0.7 part of F[CF(CF$_3$)CF$_2$O]$_9$CF(CF$_3$)CO$_2$H, 6,000 parts by volume of the 2:1 mixture of perfluoro(2-butyltetrahydrofuran) and perfluorooctane (Example 67) and 363 parts of multifilament fiber were heated at 119°–120° C. for 60 minutes in a pressure vessel. After cooling the vessel, dye exhaust was found to be complete. After a thorough scour of the dyed fabric with aqueous "Duponol" RA surfactant, the effectiveness of dyeing of the 13 fibers was found to be as follows:

| Fiber | Dye Strength | Cross Sectional Dyeing |
|---|---|---|
| Acetate (dull) | Moderate | Complete penetration |
| "Acrilan" 1656 | Stained | Ring dyed, weak |
| "Arnel" (dull) | Strong | Complete penetration |
| Cotton (raw) | Tinted | None |
| "Creslan" 61 | Stained | Ring dyed, moderate |
| "Dacron" 54 | Strong | Ring dyed, strong |
| "Dacron" 64 | Very strong | Ring dyed, very strong |
| Nylon | Very strong | Complete penetration, very strong |
| "Orlon" 75 | Tinted | Weak |
| Silk | Stained | Very weak |
| "Verel" A | Strong | Complete penetration |
| Viscose | Tinted | None |
| Wool | Stained | None |

These results, although differing in dye strength in certain cases, substantially confirm the first dyeing of this example.

EXAMPLE 70

This example demonstrates the use of water insoluble brightening agents, considered as a disperse dye herein, in the dispersion and process of this invention. A piece (100 parts) of polyester double-knit fabric was stirred with a mixture of 0.1 part of a commercially available fluorescent brightening agent ("Uvitex" ER) and 2,000 parts of F[CF(CF$_3$)CF$_2$O]$_3$CHFCF$_3$ at 152° C. After 2 minutes in the liquid, the fabric was removed, drowned in trichlorotrifluoroethane at ambient temperature and then thoroughly rinsed with acetone to remove any unfixed agent. The dried fabric was whiter than a control and, under ultraviolet light, fluoresced strongly. Fluorescence appeared very level. The control did not fluoresce.

EXAMPLE 71

A. To a mixture of 1.0 part of dye E and 5,000 parts by volume of F[CF(CF$_3$)CF$_2$O]$_3$CHFCF$_3$ were added 200 parts of a 1.5 mil thick polyethylene terephthalate film. The mixture was heated at 152° C. for about 5 minutes, during which time the dye exhausted to the film. The film was then removed, rinsed twice with trichlorotrifluoroethane and twice with acetone and dried. Dyeing was observed to be strong and level.

B. A mixture of 0.5 part of dye K, 0.5 part of C$_7$F$_{15}$CO$_2$H and 5,000 parts by volume of perfluoro(tributylamine) and 200 parts of polyester film was heated at 140°–150° C. for 5 minutes. The film exhibited a strong level dyeing.

EXAMPLE 72

A mixture of 4.5 parts of dye F and 5.0 parts of dye N was pasted with 5.0 parts of F[CF(CF$_3$)CF$_2$O]$_9$CF(CF$_3$)CO$_2$H. Then 2,000 parts by volume of perfluoro(dimethylcyclobutane) were added and the resulting mixture was dispersed with ultrasonic energy. The dispersion was further diluted with 10,000 parts by volume of perfluoro(dimethylcyclobutane) and charged to a pressure vessel containing 496 parts of polyester double-knit fabric. The sealed vessel was heated with agitation for 60 min. at 150° C. After cooling to room temperature, the vessel was discharged, the fabric was rinsed with trichlorotrifluoroethane, then with acetone and dried. The fabric was dyed level and strongly in a navy shade.

EXAMPLE 73

A 343 part piece of polyester double-knit fabric was suspended in a stirred dispersion of 0.75 part of dye D, 2.4 parts of dye L, 2.8 parts of dye M, 1.6 parts of dye A, 2.5 parts of F[CF(CF$_3$)CF$_2$O]$_9$CF(CF$_3$)CO$_2$H and 14,500 parts by volume of F[CF(CF$_3$)CF$_2$O]$_6$CHFCF$_3$ and heated at 149°–151° C. for 30 minutes with stirring. The dye exhausted to the fabric giving a strong, level black dyeing.

EXAMPLE 74

The presence of a small amount of water in the dyebath increases the rate of dyeing, as seen in earlier examples. This example quantifies the effect of water. A series of dyeings were made using 500 part pieces of polyester double-knit fabric in a pressure vessel. In each case the dyebath consisted of 2.5 parts of dye C, 1.0 part of F[CF(CF$_3$)CF$_2$O]$_9$CF(CF$_3$)CO$_2$H and 6,000 parts by volume of perfluoro(dimethylcyclobutane). Each dyeing was for 30 minutes. Several temperatures were used. A similar series of dyeings was made, each for 30 minutes, and each dyebath consisted of a mixture of 2.5 parts of dye C, 1.0 part of F[CF(CF$_3$)CF$_2$O]$_9$CF(CF$_3$)CO$_2$CH$_2$CH$_2$(OCH$_2$CH$_2$)$_6$OCH$_3$, 300 parts by volume of water and 6,000 parts by volume of perfluoro(dimethylcyclobutane). Each sample of dyed double-knit fabric was rinsed in trichlorotrifluoroethane and then in acetone at room temperature. The dyed fabrics were then analyzed for dye content by a spectrophotometric method. From the analyses, dye utilization was calculated using the formula $$\% \text{ utilization} = \frac{\text{wt. of dye in fabric} \times 100}{\text{wt. of dye used}}.$$

The results are shown in Table V. Note that the effect of water becomes less apparent as the dyeing temperature is increased.

EXAMPLE 75

Silicone nonionic surfactant (1.0 part) was dissolved in 300 parts by volume of water. The resulting solution was mixed with 2.7 parts of dye C; then 6,000 parts by volume of perfluoro(dimethylcyclobutane) were added. After agitation to produce dispersion of the dye, the mixture was added along with 483 parts of polyester double-knit fabric to a pressure vessel. Dyeing was carried out at 130° C. for 30 min. A strong level dyeing was obtained. Scouring at room temperature with acetone indicated essentially complete fixation. No evidence of unevenness was observed. The silicone surfactant is the condensation product of a poly(dialkyl)siloxane and an alkylene oxide, such as ethylene oxide, and has the general formula $R'[-Si(R)_2O]_y)_a([C_nH_{2n}O]_xR'')_b$, already referred to hereinabove.

EXAMPLE 76

Polyester double-knit fabric (500 parts) was immersed in boiling water for 30 min. The fabric was removed, patted dry with absorbent paper and placed in a pressure vessel. To the pressure vessel was added a dispersion of 2.5 parts of dye C, 1.0 part of $F[CF(CF_3)CF_2O]_9CF(CF_3)CO_2H$ and 2,000 parts of perfluoro(dimethylcyclobutane). The dyeing was carried out at 130° C. for 30 min. Dye exhaust was complete. The dyeing was strong and level.

EXAMPLES 77–79

Example 1 was repeated except that the dispersant was omitted. A strong dyeing was obtained but there were specks of dye on the dyed fabric.

Example 32 was repeated without dispersant. A strong level dyeing was obtained; dye utilization was 70%.

Example 37 was repeated at 150° C. with dye A but without dispersant. A strong level dyeing was obtained; dye utilization was not determined.

TABLE I

Polyester Double-Knit, 130 Parts by Weight

| Example No. | Solvent | P/V | Dye | P/W | Dispersant P/W | Temperature ° C. | Time Minutes | Comments |
|---|---|---|---|---|---|---|---|---|
| 1 | $F[CF(CF_3)CF_2O]_3CHCF_3$ | 1000 | A | 2 | 2 | 152 | 4 | Strong level dyeing, excellent exhaust |
| 2 | Same | 1000 | B | 2 | 2 | 152 | 4 | Same |
| 3 | Same | 1000 | C | 2 | 2 | 152 | 4 | Same |
| 4 | Same | 1000 | N | 2 | 2 | 152 | 4 | Same |
| 5 | Same | 1000 | D | 2 | 2 | 152 | 4 | Same |
| 6 | $F[CF(CF_3)CF_2O]_4CHFCF_3$ | 1000 | A | 2 | 2 | 194 | 4 | Strong dyeing, excellent exhaust |
| 7 | $F[CF(CF_3)CF_2O]_xCF_2CF_3$* | 1000 | A | 2 | 2 | 200 | 4 | Same |
| 8 | $F[CF(CF_3)CF_2O]_3CHFCF_3$ | 1000 | E | 2 | 2 | 152 | 3–5 | Strong level dyeing, excellent exhaust |
| 9 | Same | 1000 | F | 2 | 2 | 152 | 3–5 | Same |
| 10 | Same | 1000 | G | 2 | 2 | 152 | 3–5 | Same |
| 11 | Same | 1000 | N | 2 | 2 | 152 | 3–5 | Fair fixation, good exhaust |
| 12 | Same | 1000 | D | 2 | 2 | 152 | 3–5 | Strong level dyeing, excellent exhaust |
| 13 | $F[CF(CF_3)CF_2O]_3CHFCF_3$ | 1000 | H | 2 | 2 | 152 | 3–5 | Strong level dyeing, excellent exhaust |
| 14 | Same | 1000 | I | 2 | 2 | 152 | 3–5 | Same |
| 15 | Perfluorokerosene | 1500 | A | 2 | 2 | 150 | 30 | Very strong level dyeing, excellent exhaust |

*x is 32, average; M.W. is 5500

TABLE II

Polyester Double-Knit, 130 Parts by Weight

| Example No. | Solvent | P/V | Dye | P/W | Dispersant P/W | Temperature ° C. | Time Minutes | Comments |
|---|---|---|---|---|---|---|---|---|
| 16 | (a) | 1000 | A | 2 | 2 | 107 | 4 | Dye exhaust, no penetration, temperature below Tg |
| 17 | $F[CF(CF_3)CF_2O]_2CHFCF_3$ | 1000 | A | 2 | 2 | 101 | 4 | Same |
| 18 | $H[CF_2CF_2]_3CH_2OH$ | 1000 | A | 2 | 2 | 170 | 4 | Poor dyeing, good dye solvent, solubility parameter above 8.0, very poor exhaust |
| 19 | Tetrachloroethylene | 1000 | A | 2 | 2 | 120 | 5 | Weak dyeing, poor exhaust, solubility parameter of $C_2Cl_4$ = 9.7 |
| 20 | Same | 1000 | A | 2 | 2 | 120 | 5 | Weak dyeing, poor exhaust, see Example 19 |
| 21 | Same | 1500 | A | 2 | 1 | 150 | 30 | In press. vessel, weak dyeing, dye on fabric not fixed - 5% dye utilization, see Example 19 |
| 22 | n-Nonane | 1000 | A | 2 | 2 | 150 | 5 | Level weak dyeing, solubility parameter about 7.3, nonfluorocarbon liquid |
| 23 | Kerosene-purified | 1000 | A | 2 | 2 | 150–160 | 5 | Moderate dyeing, exhaust fair to poor, solubility parameter about 7.5 |
| 24 | DC-200 Silicone oil | 1000 | A | 2 | 2 | 200 | 5 | Weak dyeing, exhaust very poor, solubility parameter 7.3 |

(a) Mixture of perfluoro(2-butyltetrahydrofuran) and perfluoro(2-propyltetrahydropyran)

TABLE III

| | | | Polyester Double-Knit Fabric | | | | | | |
|---|---|---|---|---|---|---|---|---|---|
| Ex. No. | Solvent | P/V | Dye | P/W | Dispersant P/W | Temperature °C. | Time Min. | Dye Utilization % | Fabric Wt. P/W | Comments |
| 25 | Perfluorodimethyl-cyclobutane | 1500 | A | 2 | 1 | 150 | 30 | 73 | 50 | Very strong level dyeing |
| 26 | F[CF(CF$_3$)CF$_2$O]$_3$CHFCF$_3$ | 5000 | F | 6 | 3 | 152 | 5 | — | 370 | Strong level dyeing |
| 27 | Same as Example 25 | 1500 | F | 2 | 1 | 160 | 30 | 41 | 50 | Strong level dyeing |
| 28 | Same | 1500 | F | 2 | 1 | 130 | 30 | 5 | 50 | Weak dyeing, dye not fixed, temperature below Tg |
| 29 | Same | 1500 | F | 2 | 2 | 130 | 30 | 6 | 50 | Weak dyeing, temperature below Tg |
| 30 | 1,2-Dichlorohexa-fluorocyclobutane | 1500 | A | 2 | 1 | 150 | 30 | 40 | 50 | Strong level dyeing |
| 31 | Same as Example 25 | 15,000 | F | 3 | 3 | 150 | 60 | — | 560 | Strong dyeing, excellent exhaust |
| 32 | Same | 15,000 | F | 3 | 3 | 150 | 30 | 71 | 500 | Strong level dyeing |
| 33 | Same as Example 25 | 15,000 | F | 3 | 3 | 120 | 30 | 9 | 500 | Weak dyeing, excellent exhaust, dye not fixed, temperature below Tg |
| 34 | Same | 1500 | A | 2 | 1 | 149–151 | 30 | 58 | 50 | Strong level dyeing |
| 35 | Same | 15,000 | A | 5.3 | 5 | 150 | 30 | 85 | 500 | Strong level dyeing |
| 36 | Same | 1500 | F | 2 | 1 | 130 | 30 | 5 | 50 | Weak dyeing, dye not fixed, temperature below Tg |
| 37 | Same | 15,000 | F | 5 | 5 | 150–2 | 30 | 72 | 500 | Strong level dyeing |
| 38 | Same as Example 30 | 6000 | F | 2.7 | 2.5 | 149–152 | 30 | 59 | 250 | Strong level dyeing |
| 39 | CF$_3$CCL$_2$CF$_3$ | 6000 | A | 2.2 | 2.5 | 148–150 | 30 | 57 | 250 | Strong level dyeing, fair to good exhaust, solubility parameter about 6.3 |
| 40 | Same as Example 25 | 15,000 | A | 5.5 | 5 | 140–143 | 30 | 83 | 500 | Strong level dyeing |
| 41 | CF$_3$CFClCF$_2$Cl | 6000 | A | 2.5 | 2.5 | 150 | 30 | 48 | 250 | Moderately strong dyeing, fair exhaust, solubility parameter 6.3 |
| 42 | Perfluorodimethyl-cyclobutane | 15,000 | F | 6.1 | 5 | 140 | 30 | 46 | 500 | Not as good as at 150° C. |
| 43 | CF$_3$CFClCFClCF$_3$ | 6000 | A | 2.6 | 2.5 | 150–2 | 30 | 67 | 250 | Strong dyeing, excellent exhaust, solubility parameter 6.5 |
| 44 | Same as Example 16 | 6000 | A | 2.7 | 2.5 | 148–160 | 30 | 85 | 250 | Strong level dyeing, excellent exhaust |
| 45 | Perfluoro(N-propyl-morpholine) | 6000 | A | 2.3 | 2.5 | 149–153 | 30 | 86 | 250 | Strong level dyeing, excellent exhaust |
| 46 | Mixture Perfluoro(2-butyltetrahydrofuran) | 6000 | A | 2.7 | 2.5 | 151–6 | 30 | 92 | 250 | Strong level dyeing, excellent exhaust |
| 47 | Octafluoro-1,4-di-thiane | 4000 | A | 2.5 | 2.5 | 150–5 | 30 | 55 | 250 | Strong level dyeing, excellent exhaust |
| 48 | Same as Example 42 | 15,000 | F | 5 | 5 | 140–1 | 30 | — | 500 | Strong level dyeing |
| 49 | CF$_2$ClCFCl$_2$ | 1500 | A | 2 | 1 | 150–3 | 30 | 30 | 50 | Level dyeing, solubility parameter about 7.3 |
| 50 | Same | 1500 | G | 2 | 1 | 150 | 30 | 10 | 50 | Splotchy dyeing |
| 51 | Same | 1500 | H | 2 | 1 | 150 | 30 | — | 50 | Splotchy dyeing |
| 52 | Same | 1500 | F | 2 | 1 | 170 | 30 | 43 | 50 | Strong level dyeing |
| 53 | CCl$_3$CF$_2$CF$_2$Cl | 6000 | A | 2.6 | 2.5 | 148–153 | 30 | 14 | 250 | Weak dyeing, poor exhaust, solubility parameter about 7.2 |
| 54 | CCl$_3$CF$_2$CF$_3$ | 6000 | A | 2.3 | 2.5 | 150–2 | 30 | 42 | 250 | Moderately strong dyeing, fair exhaust, solubility |

TABLE III-continued

| Ex. No. | Solvent | P/V | Dye | P/W | Dispersant P/W | Temperature °C. | Time Min. | Dye Utilization % | Fabric Wt. P/W | Comments |
|---|---|---|---|---|---|---|---|---|---|---|
| 55 | $CF_3CFClCCl_2CF_3$ | 6000 | A | 2.4 | 2.5 | 150–3 | 30 | 41 | 250 | parameter about 7.0 Moderately strong, dyeing, fair exhaust, solubility parameter 7.0 |
| 56 | $CF_2ClCFCl_2$ | 15,000 | A | 5 | 5 | 140 | 30 | 16 | 500 | Same, solubility parameter 7.2 |
| 57 | Tetrachloroethylene | 15,000 | F | 5.6 | 5 | 150–6 | 30 | 9 | 500 | Weak dyeing, poor exhaust, solubility parameter greater than 7.0 |
| 58 | $[(CF_3)_2CF]_2C=C(CF_3)F*$ $[(CF_3)_2CF][C_2F_5]C=C(CF_3)_2$ $(CF_3)_2CFCF=C(CF_3)(CF_2)_3F$ | 263 | A | 1 | 1 | 150 | 30 | — | 90 | Strong level dyeing, good exhaust |
| 59 | Same | 375 | F | 1.2 | 1 | 150 | 30 | — | 128 | Strong level dyeing, good exhaust |

*Anionic Oligomers of Hexafuloropropene. Structures are those assigned by Brunskill et al., J. Chem. Soc., Sect. D, 1970, 1444.

TABLE IV

Polyester Double-Knit Fabric

| Example No. | Solvent | P/V | Dye | P/W | Dispersant P/W | Temperature °C. | Time Min. | Dye Utilization % | Fabric Wt. P/W | Carrier | P/W | Comments |
|---|---|---|---|---|---|---|---|---|---|---|---|---|
| 60 | Perfluorodimethylcyclobutane | 15,000 | F | 3 | 1 | 120 | 30 | — | 500 | Benzoic Acid | 15 | Excellent exhaust, dye not fixed Temp. below Tg |
| 61 | Same | 15,000 | F | 3 | 5 | 120 | 30 | 12 | 500 | Butyl Benzoate | 15 | Same as Example 60 |
| 62 | $CF_2ClCFCl_2$ | 15,000 | A | 5 | 15 | 140–2 | 30 | — | 500 | $H_2O$ | 150 | Moderately strong dyeing, solubility parameter 7.2 |
| 63 | Same | 15,000 | A | 5 | 15 | 140–2 | 30 | 29 | 500 | $H_2O$ | 100 | Same |
| 64 | Same | 15,000 | A | 5 | 5 | 139–141 | 30 | 30 | 500 | $H_2O$ | 652 | Same |
| 65 | Same as Ex. 60 | 1500 | A | 2 | 1 | 150 | 30 | 68 | 50 | Benzoic Acid | 5 | Very strong level dyeing |
| 66 | $CF_2ClCFCl_2$ | 1500 | F | 2 | 1 | 170 | 30 | 47 | 50 | Same | 5 | Strong level dyeing, solubility parameter 7.2 |

TABLE V

| Temperature °C. | % Dye Utilization | |
|---|---|---|
| | dry | With Water |
| 110 | 4 | 35, 42 |
| 120 | — | 59 |
| 130 | 40, 41 | 76, 79 |
| 140 | 79 | 85 |
| 150 | 85, 90 | 91 |
| 160 | 90 | — |

I claim:

1. Dye dispersion comprising:
 a. an organic disperse dye; and
 b. a normally liquid fluorocarbon having a fluorine to carbon atom ratio of at least 1.5, a solubility parameter of not greater than 7.0, a boiling point of at least 20°–25° C at atmospheric pressure, a critical temperature of at least 135° C. and being selected from the group consisting of
  1. perfluoro(2,3-dimethylbutane), perfluorokerosene and its constituents boiling above 100° C or $(CF_3)_2CF(CF_2CF_2)_{2-4}CF(CF_3)_2$,
  2. perfluorocycloaliphatic hydrocarbons,
  3. chlorofluoroalkanes,
  4. hydrofluoroalkanes,
  5. hydrochlorofluoroalkanes,
  6. perfluoroalkyl ethers,
  7. hexafluoropropylene oxide polymers having a degree of polymerization of 1–50,
  8. perfluoro(tri-$C_{1-12}$alkylamines) and
  9. unsaturated fluorocarbons having 3–4 perfluoroalkyl groups of 1–10 carbon atoms attached to the

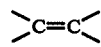

moiety, each of said groups (1)–(6) having no more than 18 carbon atoms.

2. The dispersion of claim 1 containing up to 5 volume % of water.

3. The dispersion of claim 1 wherein the liquid fluorocarbon has a fluorine to carbon atom ratio of at least 2.0.

4. The dispersion of claim 3 wherein the liquid fluorocarbon has a solubility parameter of not greater than 6.5.

5. The dispersion of claim 1 wherein the liquid fluorocarbon is a branched perfluoroaliphatic hydrocarbon.

6. The dispersion of claim 1 wherein the liquid fluorocarbon is a perfluorocycloaliphatic hydrocarbon.

7. The dispersion of claim 1 wherein the liquid fluorocarbon is a perfluoro(trialkylamine).

8. The dispersion of claim 1 wherein the liquid fluorocarbon is $F[CF(CF_3)CF_2O]_nCHFCF_3$ wherein $n$ is an integer within the range 1–50.

9. The dispersion of claim 8 wherein $n$ is an integer within the range 3–6.

10. The dispersion of claim 9 wherein the liquid fluorocarbon is $F[CF(CF_3)CF_2O]_3CHFCF_3$.

11. The dispersion of claim 1 containing an effective amount of a surfactant having a hydrophilelipophile balance value of less than 4 and having solubility in the liquid fluorocarbon.

12. Single step exhaust dyeing process for dyeing disperse dyeable synthetic polymers in the form of films, fibers or fabrics, said process comprising contacting disperse dyeable synthetic polymer with a dye dispersion at a temperature above the glass transition temperature of the polymer for a sufficient time to exhaust the dye from the dispersion and dye the polymer, said dye dispersion comprising the dispersion of claim 1.

13. The process of claim 12 wherein the disperse dyeable synthetic polymer is polyethylene terephthalate and the temperature is at least 125° C.

* * * * *